United States Patent [19]
Ando et al.

[11] Patent Number: 5,777,614
[45] Date of Patent: Jul. 7, 1998

[54] EDITING SUPPORT SYSTEM INCLUDING AN INTERACTIVE INTERFACE

[75] Inventors: Haru Ando, Kokubunji; Nobuo Hataoka, Kanagawa-ken, both of Japan

[73] Assignee: Hitachi, Ltd., Tokyo, Japan

[21] Appl. No.: 542,736

[22] Filed: Oct. 13, 1995

[30] Foreign Application Priority Data

Oct. 14, 1994 [JP] Japan .................................. 6-249072

[51] Int. Cl.$^6$ ........................................................ G06F 3/00
[52] U.S. Cl. ........................................................ 345/333
[58] Field of Search .............................. 395/336, 337, 395/338; 345/333, 334, 336, 337, 339, 977, 978, 473

[56] References Cited

U.S. PATENT DOCUMENTS

| | | | |
|---|---|---|---|
| 5,042,006 | 8/1991 | Flohrer | 345/337 |
| 5,201,034 | 4/1993 | Matsuura et al. | 345/337 |
| 5,317,688 | 5/1994 | Watson et al. | 345/337 |
| 5,377,319 | 12/1994 | Kitahara et al. | 345/337 |
| 5,388,251 | 2/1995 | Makino et al. | 395/185.1 |
| 5,488,686 | 1/1996 | Murphy et al. | 345/330 |
| 5,544,050 | 8/1996 | Abe et al. | 345/334 |
| 5,600,765 | 2/1997 | Ando et al. | 345/433 |

FOREIGN PATENT DOCUMENTS 6-83294 of 1994 Japan.

OTHER PUBLICATIONS

Mori, M., "A Multi-Purpose Dialogue Management System, ..." Robot and Human Comm., 1995 Int'l Workshop, pp. 187–192.

Muller, M., "Voice Interfaces to Information and Help Resouces, ..." Globecom '90, IEEE, pp. 642–645.

"A Speech Dialogue Management System for Human Interface..."Y. Hiramoto, Robot and Human Comm. 1994, pp. 277–282.

Bolt, R., "Put-That-There": Voice and Gesture at the Graphic Interface, ACM 1980, pp. 262–70.

Ando, H., "Evaluation of Multimodal Interface Using Spoken Language . . . ," ICSLP 94, Yokohama, pp. 567–570.

Maes, P. et al, "Learning Interface Agents," Proc. of 11th Nat. Conf. on AI, pp. 459–465, 1993.

"Fundamental of Speech Information Processing", Saitoh & Nakata, pp. 97–103, Japanese version.

"Discussion on a Method for Accepting Speech Input", Kitahara, et al., pp. 101–102, Japanese version.

Kana to Kanji Conversion by a Computer, Aizawa, et al., pp. 261–289.

"Symboisis of Human and Artifact", Advances in Human Factors/Ergonomics, 20A, Proceedings of the 6th International Conference on Human–Computer Internaction (HCI International '95), Tokyo, Japan, Jul. 9–14, 1995, vol. 1.

Primary Examiner—A. Katbab
Attorney, Agent, or Firm—Antonelli, Terry, Stout & Kraus, LLP

[57] ABSTRACT

An editing system having a dialogue operation type interface directs a next operation by referring an operation history. User information is inputted by using speech input/output, pointing by a finger and 3-D CG. A human image representing the system is displayed as an agent on the image output device, and a user error, availability to a queue and a utilization environment are extracted by the system and informed to the user through the agent. The system responds to the user intent by the image display or the speech output by using the agent as a medium so that a user friendly interface for graphics edition and image edition is provided.

20 Claims, 20 Drawing Sheets

FIG. 4

| PART NAME | ID NUMBER | X CENTER COORDI- NATE | Y CENTER COORDI- NATE | LONGI- TUDINAL WIDTH | LATERAL WIDTH | TABLE NUMBER |
|---|---|---|---|---|---|---|
| CHAIR | 5001001 | 560 | 480 | 130 | 70 | |
| DESK | 5002001 | 560 | 380 | 80 | 100 | |
| | 5002002 | 770 | 400 | 80 | 100 | |
| PLANT | 5006001 | 270 | 450 | 170 | 150 | |
| LAMP | 5005001 | 360 | 180 | 70 | 70 | 1 |
| PICTURE | 5003001 | 700 | 180 | 90 | 50 | |
| ⋮ | ⋮ | ⋮ | ⋮ | ⋮ | ⋮ | |

FIG. 8

| COORDINATE NUMBER M | t | x | y |
|---|---|---|---|
| 1 | 22301 | 780 | 380 |
| 2 | 22302 | 782 | 385 |
| 3 | 22303 | 781 | 384 |
| ⋮ | ⋮ | ⋮ | ⋮ |
| 10 | 22335 | 780 | 383 |
|  |  |  |  |
| ⋮ | ⋮ | ⋮ | ⋮ |

| WORD | CONTENT OF WORD | CONTENT NUMBER |
|---|---|---|
| HERE | PRONOUN FOR INSTRUCTION OF PLACE | 601 |
| CHAIR | OBJECT | 5001 |
| DESK | OBJECT | 5002 |
| PICTURE | OBJECT | 5003 |
| SAFE | OBJECT | 5004 |
| "WO" | PARTICLE FOR INSTRUCTION OF OBJECT | 904 |
| "NI" | PRONOUN FOR INSTRUCTION OF PLACE | 905 |
| THIS | PRONOUN FOR INSTRUCTION OF PLACE | 5012 |
| SEARCH | VERB FOR SEARCHING | 701 |
| MOVE | VERB FOR MOVEMENT | 702 |
| COPY | VERB FOR COPYING | 703 |
| NO | VERB FOR NEGATION | 704 |
| : | : | : |

271 — WORD
272 — CONTENT OF WORD
273 — CONTENT NUMBER

FIG. 12

| SPEECH WAVEFORM FILE 281 | CHARACTER STRING DATA 282 |
|---|---|
| 1 | IN A WALL |
| 2 | WHICH DO YO SELECT ? |
| 3 | EITHER WILL BE |
| 4 | WAIT FOR A MOMENT |
| 5 | IT IS HARD TO PUT IT HERE |
| 6 | |
| 7 | |
| 8 | |
| 9 | |
| 10 | |
| 11 | |
| 1201 | HOW ABOUT FRONT OF THIS DESK ? |
| 1202 | HOW ABOUT FRONT OF RIGHT DESK ? |
| : | : |

FLOW CHART 2

FLOW CHART 3

FLOW CHART 5

EDITING SUPPORT SYSTEM INCLUDING AN INTERACTIVE INTERFACE

BACKGROUND OF THE INVENTION

The present invention relates to a user interface for a text processing system or a graphics editing system utilizing speech input/output built in an OA equipment such as a personal computer, a workstation or a word processor, or a speech application system having a screen for displaying an operation result.

In a related system as disclosed in U.S. Ser. No. 08/137,788, now U.S. Pat. No. 5,600,765, invented by the inventors of the present application and filed on Oct. 19, 1993, entitled "Complex Form Input System", a user is required to reenter whole information even if only a portion of the input information is to be corrected, and a help function to show an alternative when the user points an error position is not provided. Namely, in the prior art, if an input by the user is an executable command to the system, the system executes the command as it is. If a command which is not executable by the system, for example, a copy command for a system having no copy function, is issued, a warning indicating non-executable is presented by the system. When user notices the warning, the user spontaneously executes a help system of the system. For an unpracticed user, it is difficult to refer explanation of a necessary help function. For a user input, the system always presents the same response without regard to the past system utilization status by the user. When a user interruption occurs during the operation of the system, the interruption is given a priority and the current operation is temporarily stopped to conduct the interruption.

SUMMARY OF THE INVENTION

In the prior art, the user must detect an error and when the user detects the error, the user must input whole information from the beginning. Further, since the response from the system is always constant without reared to the user status or the use environment of the system, the extent of the system operation state cannot be grasped and the user is hard to utilize the system.

It is an object of the present invention to provide an interface for text preparation, graphics edition and image edition which supports a user operation and which is user friendly, by allowing efficient input by speech input/output or finger pointing and displaying a 3-D (three-dimensional) CG (computer graphics) in a part of a screen under process to give a direction from the system to the user operation.

The above object of the present invention is achieved by a system which holds a user input content, predicts the next operation from the content and presents the operation.

The present invention provides a system which improves user operability and which is user friendly by substituting the system as if it were human beings through a human image displayed on a screen to convey a proposal by the system to create an environment of dialogue with the human.

The present invention comprises the following elements:

Input means includes a speech input device, an image input device (camera), a touch panel (pointing device) associated with coordinate positions of a display screen and an eye tracking input device for reading an eye line position of a user on the screen as a coordinate. Information is read in from those various types of input means to execute the system operation.

Output means includes a speech output device (speaker) and an image output device having a display screen. The display screen has a partial image display area for mainly displaying a system status in addition to an object to be processed. A human image is displayed in the image display area and a manner of display of the human image is changed in accordance with a past user input state.

The system holds a history of the user input command content and input times. When the same command content continues more than a predetermined number of times, the system automatically notifies the continuation of that command content through the human image displayed on the partial image display area. Specifically, an action which simulates the dialogue with the user and a speech output synchronized with the action are presented.

If a next input does not appear after the elapse of a predetermined time period from the immediately previous input time, the following input is prompted by using the human image displayed in the partial image display area.

When a speech input from the user cannot be correctly recognized and a correction command is issued to the system, the system expresses apology by using the human image displayed in the partial image display area.

Still further advantages of the present invention will become apparent to those of ordinarily skilled in the art upon reading and understanding the following detailed description of the preferred and alternate embodiments.

BRIEF DESCRIPTION OF THE DRAWINGS

The invention will be described in conjunction with certain drawings which are for the purpose of illustrating the preferred and alternate embodiments of the invention only, and not for the purpose of limiting the same and wherein:

FIG. 4 shows an example of a graphics draw table.

FIG. 8 shows a data structure of a pointing area table.

FIG. 9 shows an example of a data structure of a word dictionary.

FIG. 12 shows an example of content of a speech waveform dictionary.

DETAILED DESCRIPTION OF THE PREFERRED EMBODIMENTS

The embodiments of the present invention will be explained with reference to the drawings.

First, an agent is explained. Concept of agent is classified in two major classes. One is an application to a distributed system or a communication system. In this case, the agent moves over a network connecting a plurality of terminals to autonomously acquire necessary information and integrates information acquired among agents to execute a task. Other concept is an application to a user interface as disclosed in the present invention. For example, it predicts an intention of user operation and presents or inquires a next operation from a terminal to support the user operation. In this case, it is an application to a user interface to display a human image drawn by a computer graphics on a terminal screen to visually support the dialogue operation between the user and the system.

In the present embodiment, an interior design support system having a multiple forms of input means is assumed. Particularly, the present embodiment is constructed to determine support to mis-entry of the user, input guidance to shorten an input time and atomization of a user operation by the system and inform the decision from the system directly to the user. The interior design support system is categorized in a graphics editing system. The graphic editing system collectively refers to a system for handling images and graphics such as a CAD system and an image processing system. The concept of the present invention allows the application to not only the graphics editing system but also a scheduling management system and a retrial system.

Figure 1:
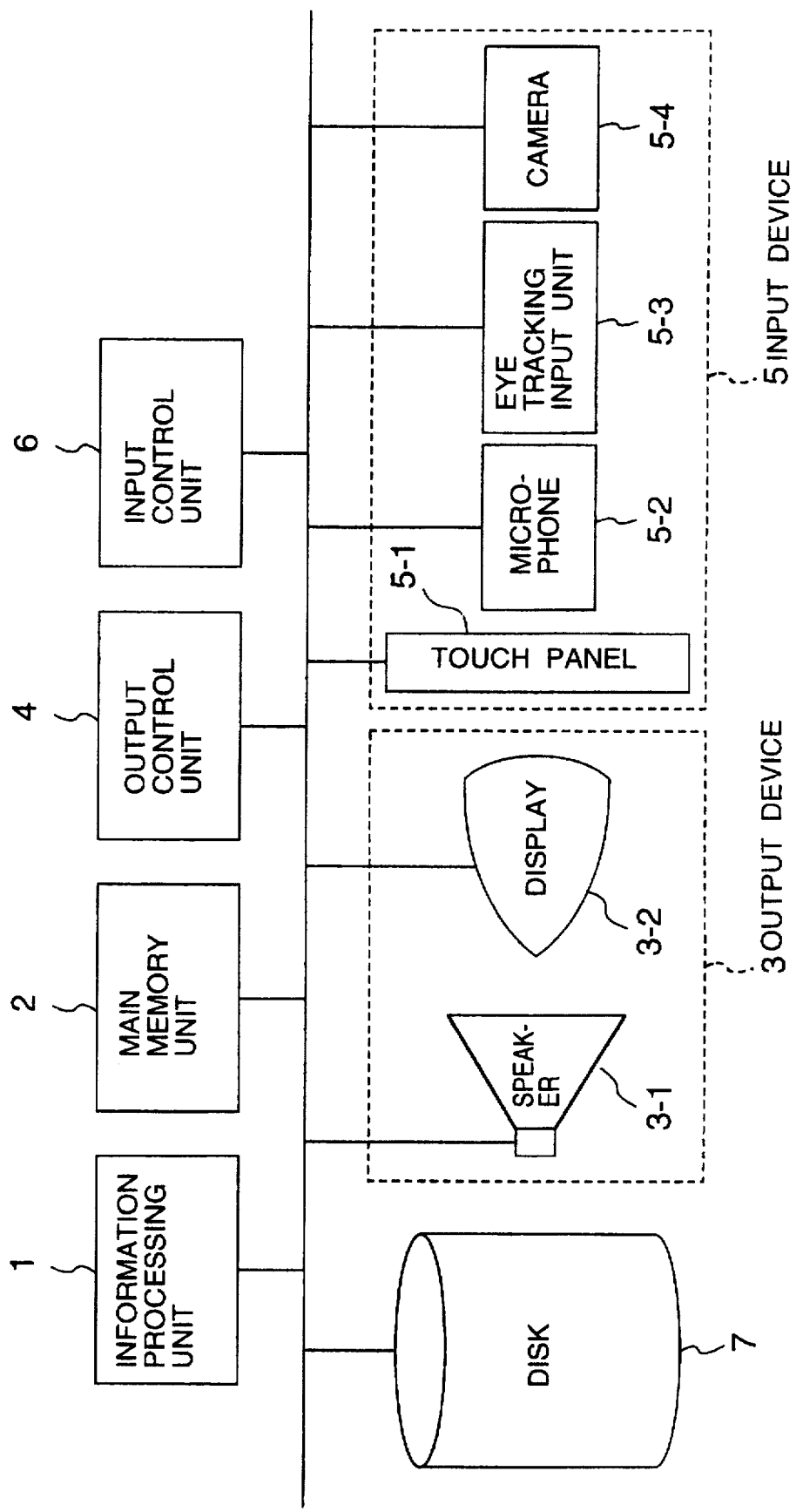
FIG. 1 shows a configuration of an overall system.

FIG. 1 shows a block diagram of an overall configuration of the interior design support system of the present invention.

When the system shown in FIG. 1 is powered up, a CPU 1 is started up and a content of a disk 7 is loaded to a main memory 2.

Figure 2:
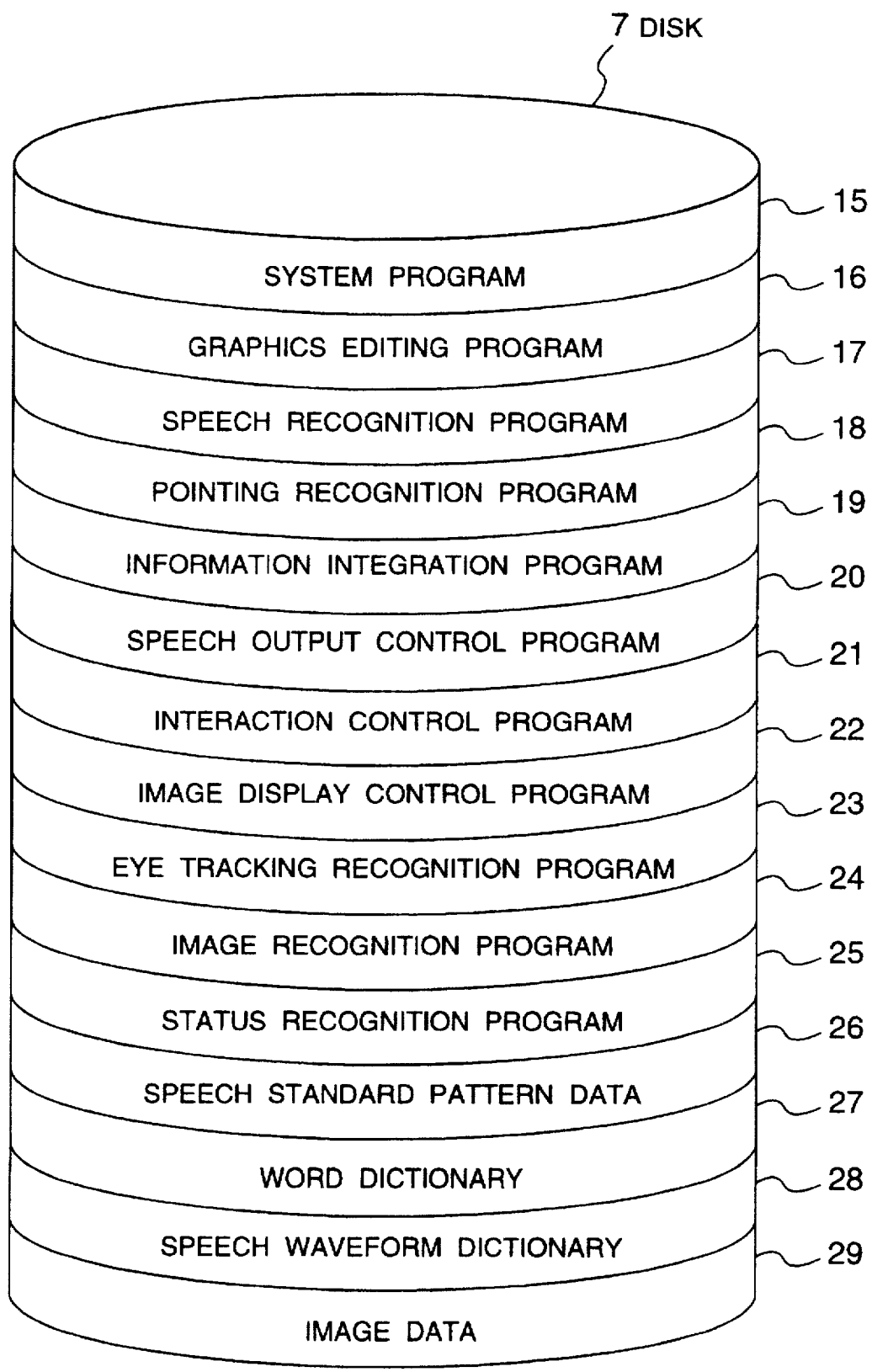
FIG. 2 shows a storage content of a disk of a system of the present invention.
Figure 3:
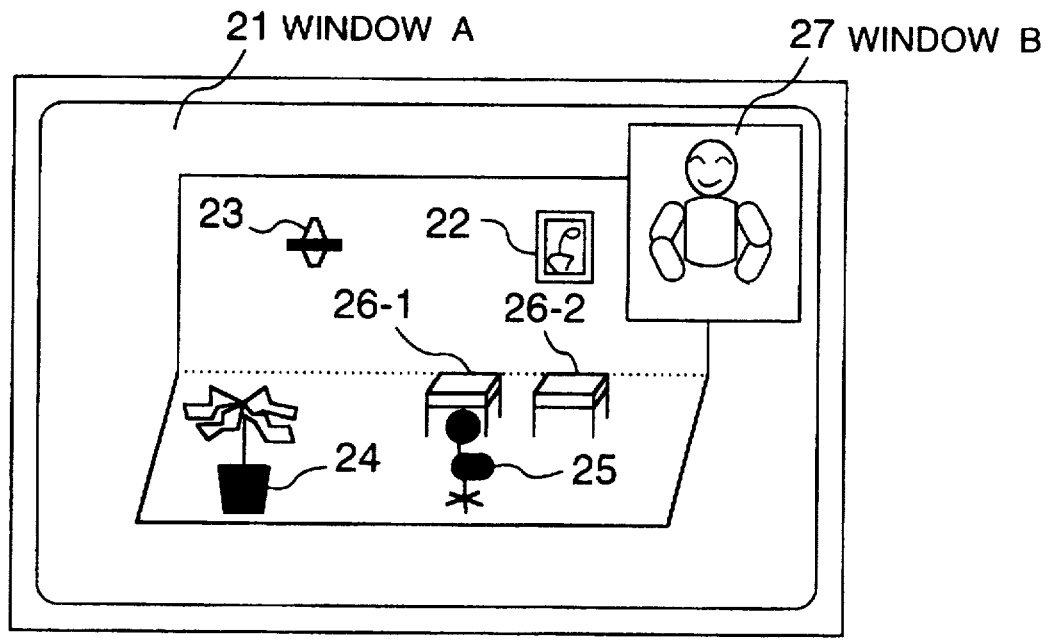
FIG. 3 shows a display screen of a display device of the present invention.

As shown in FIG. 2, the disk 7 stores a system program 15, a graphics editing program 16, a speech recognition program 17, a pointing recognition program 18, an information integration program 19, a speech output control program 20, a dialogue control program 21, an image display control program 22, an eye tracking recognition program 23, an image recognition program 24, a status recognition program 25, speech standard pattern data 26, a word dictionary 27, a speech waveform dictionary 28 and image data 29. The programs which are mainly used for input are the speech recognition program 17, the pointing recognition program 18, the information integration program 19, the eye tracking recognition program 23 and the image recognition program 24, and the programs used for output are the speech output control program 20 and the image display control program. FIG. 3 shows an example of editing screen displayed in a window A 21 of a display 4 by the graphics editing program 16 loaded in the main memory 2. As individual parts for the interior design, a picture 22, a lamp 23, a plant 24 and a chair 25 and two desks (26-1, 26-2) are displayed. A human image is displayed in a window B 27 by the image display control program 22. The human image in the window B 27 is displayed to visually smoothen the dialogue between the system and the user. Alternatively, the dialogue may be supported without displaying the window B 27 as will be explained later.

The display screen data are drawn based on a graphics draw table 40 (FIG. 4) in the image data 29. The graphics draw table 40 contains a name of part to be displayed 41, identification number 42 of each part, coordinates 43 and 44 indicating a display position, a size of part (45, 46) and a table number 47. The table number 47 is an identification number when a plurality of graphics draw tables are set.

Figure 5:
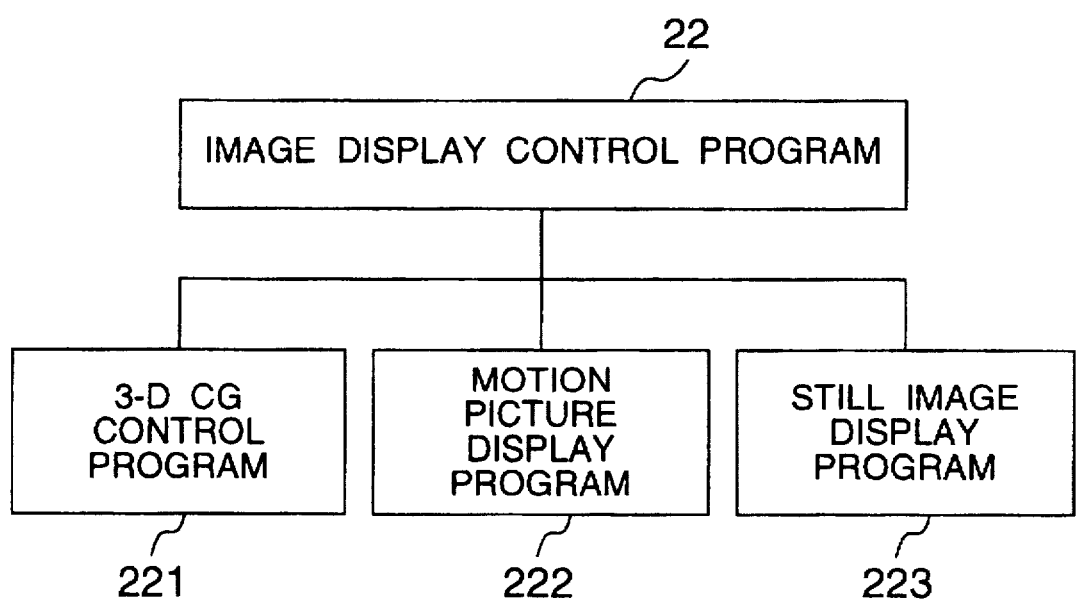
FIG. 5 shows a structure of an image display control program.

FIG. 5 shows a structure of the image display control program 22. The image display control program 22 comprises a 3-D CG combination output program 221, a motion picture display program 222 and a still image display program 223. The human image displayed in the window B is drawn by the 3-D CG combination output program 221.

Under such a condition, the user conducts an editing operation by utilizing input/output devices 4 and 5 for an item displayed on the screen. The input device may include a touch panel 5-1, a microphone 5-2, an eye tracking input device 5-3 and a camera 5-4. In the present embodiment, the input status of the eye tracking input device 5-3 is continuously monitored during the editing operation.

The user sounds to the microphone 5-2 such as "Move a chair here" while he points a movement position on the touch panel 5-1. When an information processing system 1 recognizes the input from the microphone 5-2, it starts the speech recognition program 17 transferred to the main memory 2 and also starts the pointing recognition program 18 and the dialogue control program 21.

Referring to flow charts shown in FIGS. 14 to 21, a flow of overall process is explained.

When the present system is switched on, the system program 15 is started and then the graphics editing program 16, the speech recognition program 17, the pointing recognition program 18, the dialogue control program 21 and the image display control program 22 are started. Thereafter, other programs are started as required.

Figure 14:
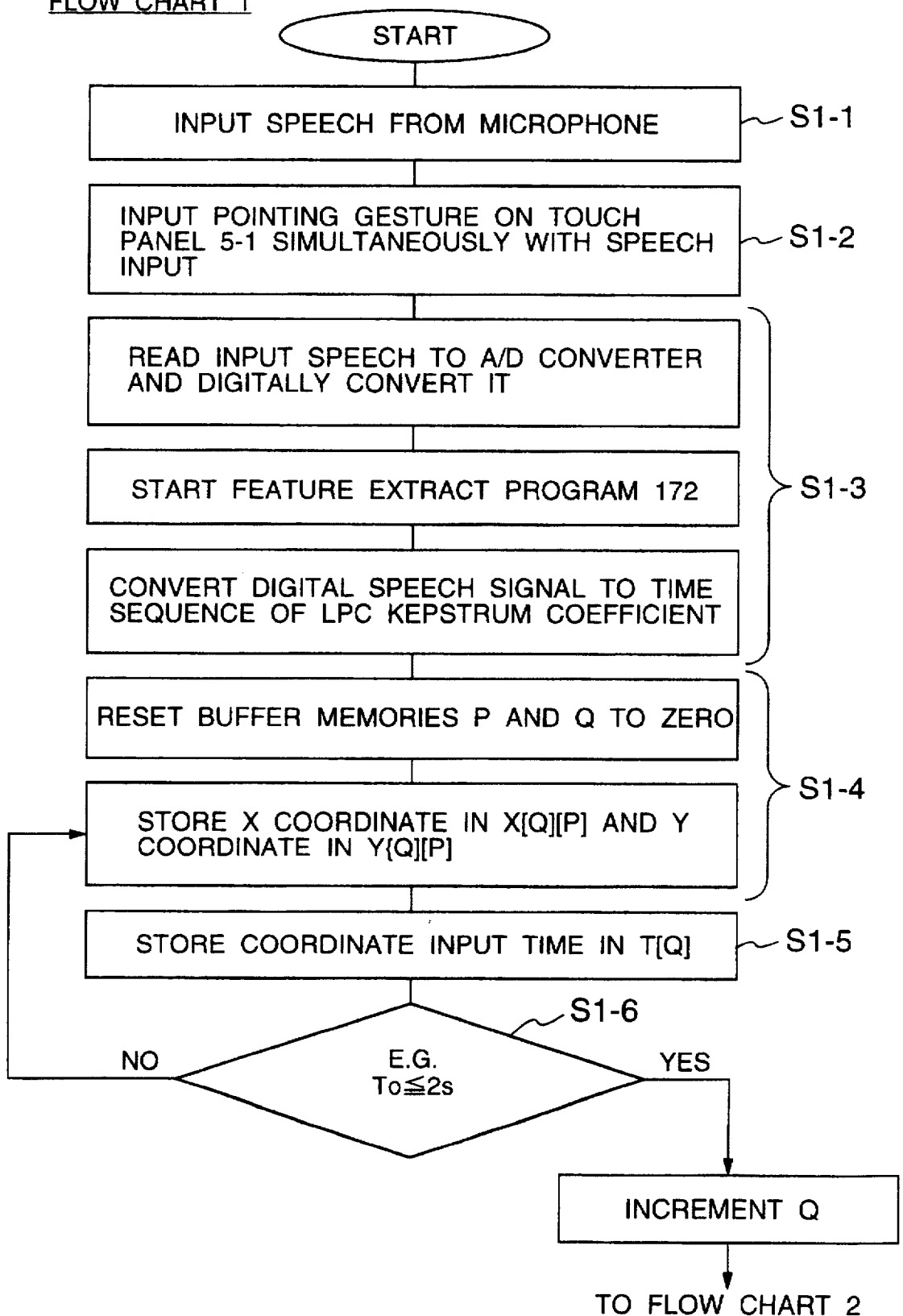
FIG. 14 shows a flow chart illustrating a process operation of the present invention.
Figure 15:
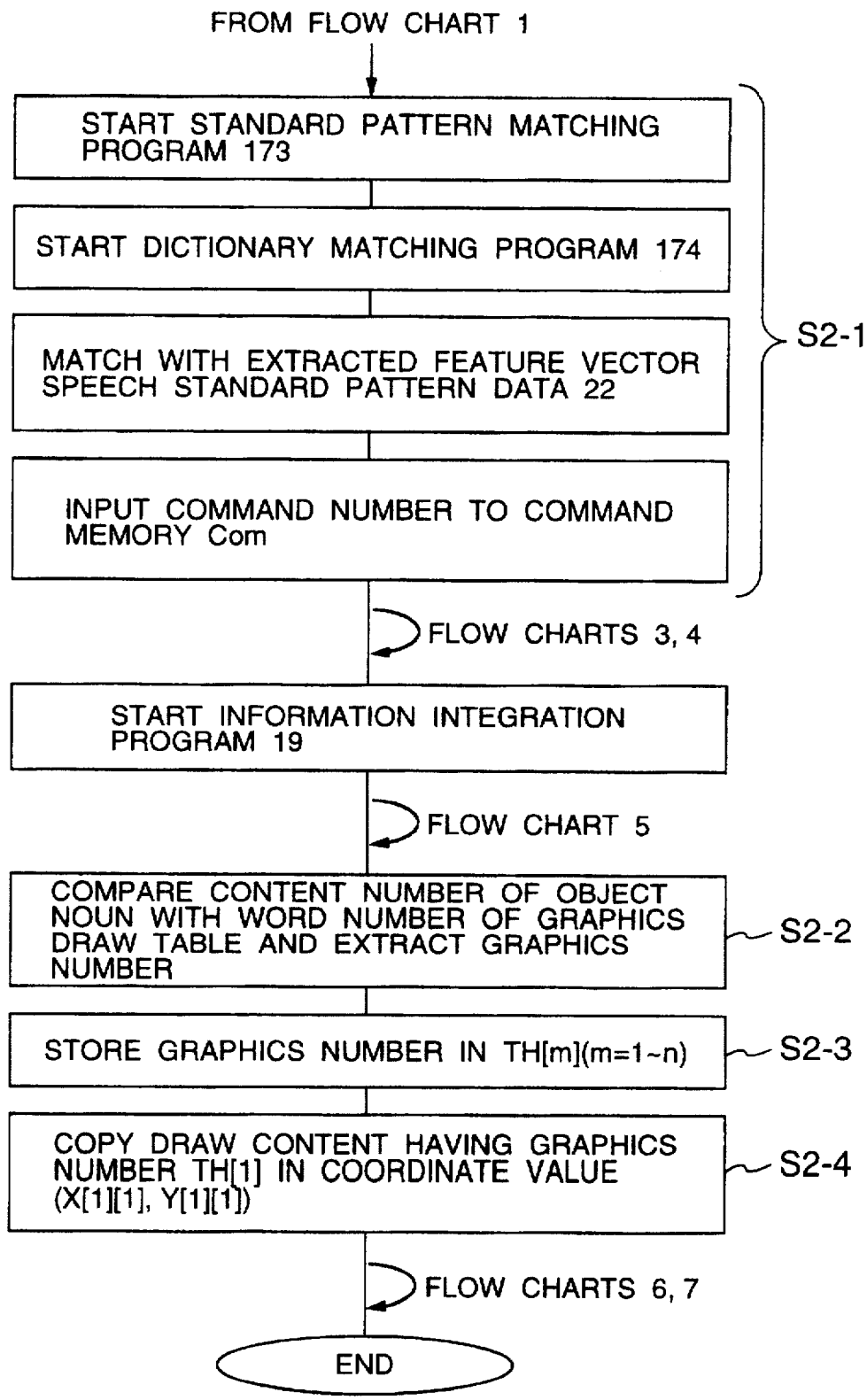
FIG. 15 shows a flow chart illustrating a process operation of the present invention.
Figure 16:
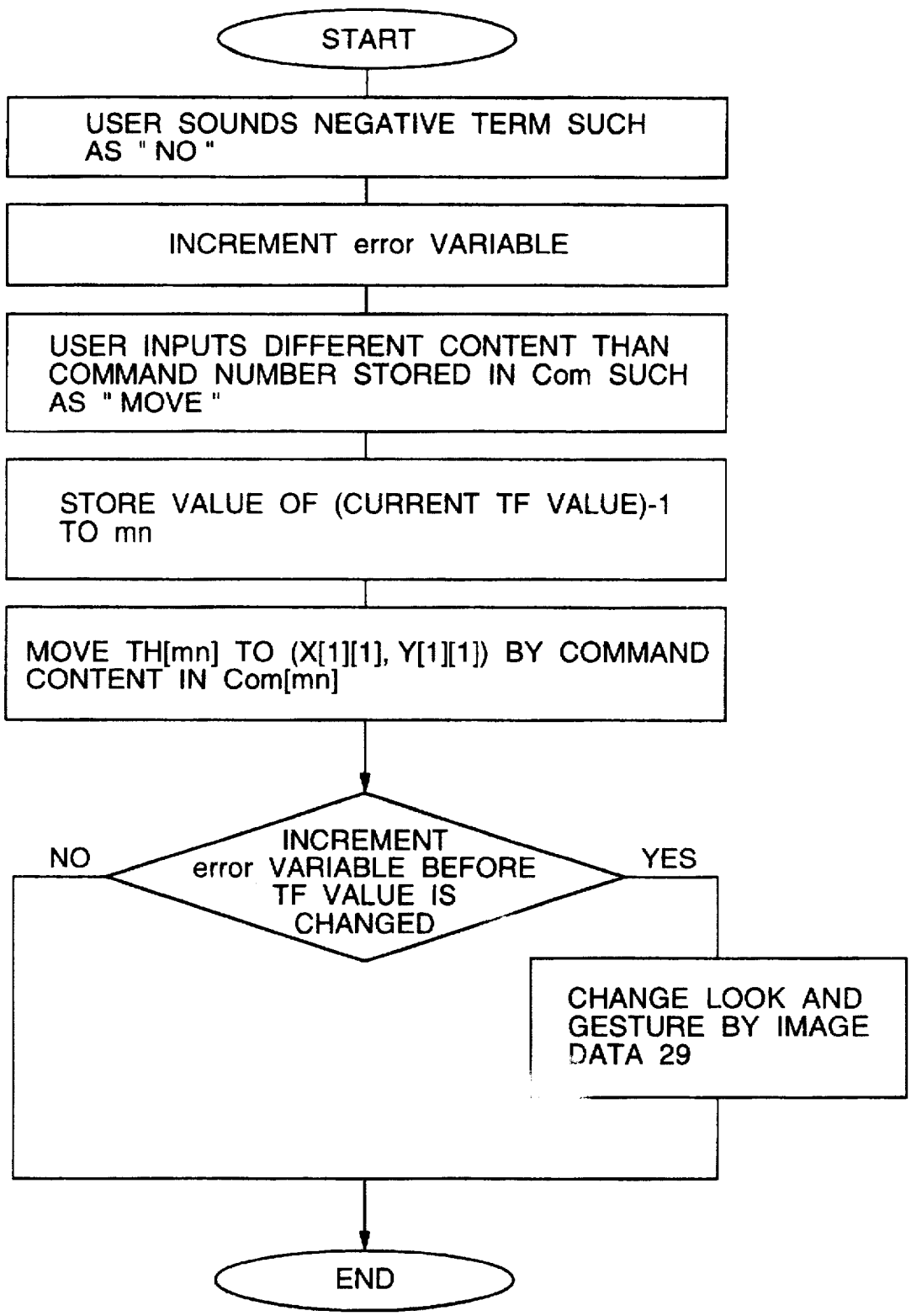
FIG. 16 shows a flow chart illustrating a correction operation for a process.

A flow chart 1 shown in FIG. 14 and a flow chart 2 shown in FIG. 15 show a basic process of the present system. The user input a process command by speech from the microphone (s1-1) and simultaneously inputs pointing gesture from the touch panel 5-1 (s1-2). The pointing gesture inputs information primarily relating to a position for the process command inputted by the speech.

The inputted speech is converted to a digital signal for the speech recognition (s1-3), and the position information inputted by the pointing gesture is stored in the memory (s1-4). For example, it is assumed that the chair (35 in FIG. 3) on the display screen is pointed and then a right corner of the display screen is pointed and "Move this here" is sounded. At this time, the position of origin for the position of the object corresponding to "this" is stored at X[Q][P], where Q and P are two-dimension memories. A number identifying an area in the memory in which the information on the first pointed position (that is, the information of origin) or the information on the secondly pointed position is stored (for example, Q=1 for the first pointed position and Q=2 for the secondly pointed position) is inputted to Q. Information on the pointing, that is, specific coordinate, or when the pointing points an area on the display screen, an area in the memory in which the coordinate of that area is stored are inputted to P. Similarly, information on the second pointing is inputted to Y[Q][P].

The time of pointing, that is, the time at which the information on Q=1 or 2 is inputted is stored in the memory T[Q](s1-5). Then, a time interval $T_0$ of the input process conducted is monitored (s1-6) and if it exceeds a predetermined time, it is regarded that the input process command has been established and the process proceeds to the next step. This process is shown in the flow chart of FIG. 15.

The meaning of the recognized speech command is specified and the command is stored in a memory Com (s2-1).

Figure 17:
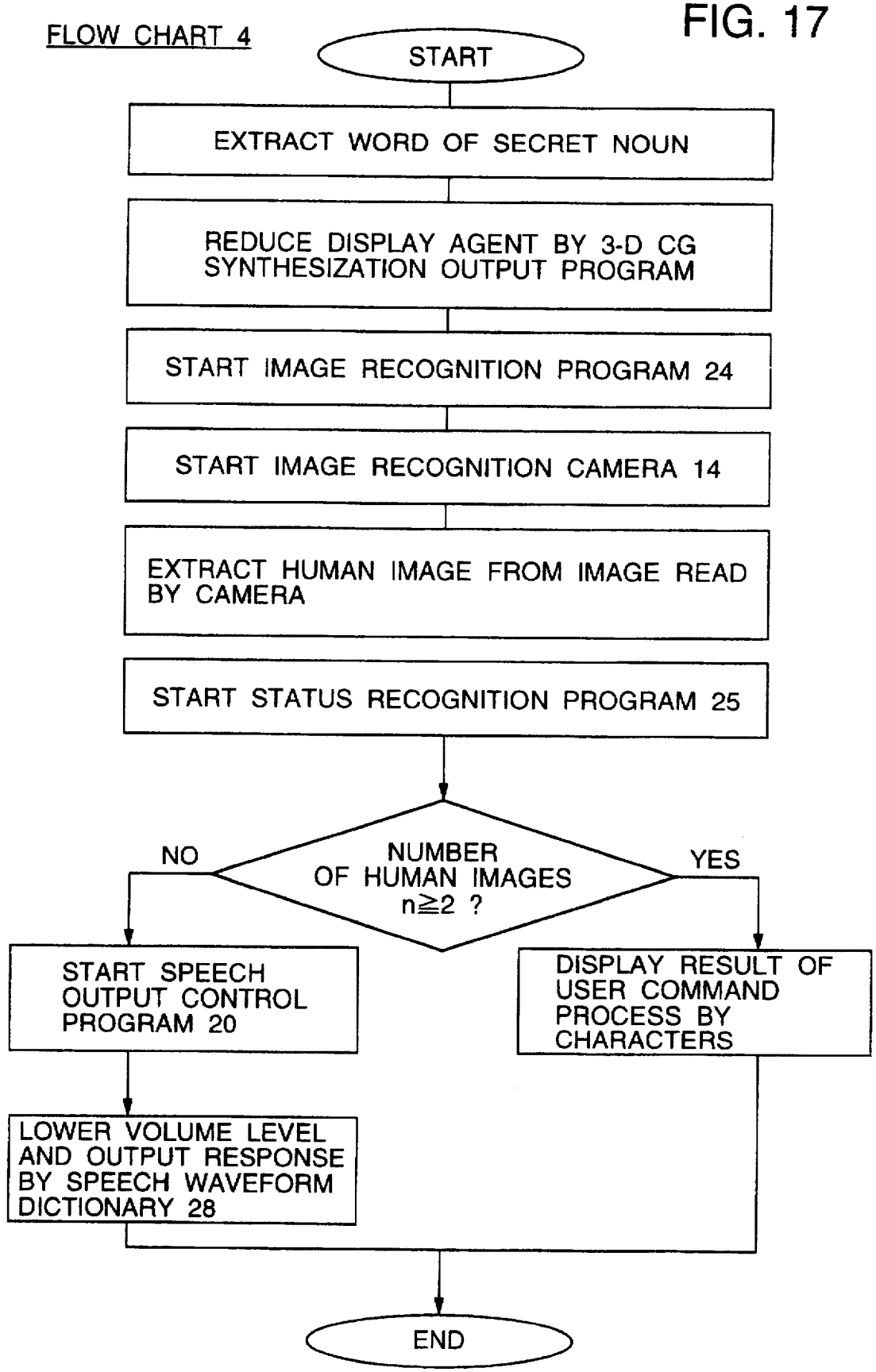
FIG. 17 shows a flow chart illustrating a process when a secret noun is included.

If a word indicating secret is included in the recognized speech, a process of a flow chart 4 shown in FIG. 17 is conducted. When a number of people other than the user are recognized by the image recognition, the result of processing is displayed by characters instead of speech. The display of characters makes the recognition of the result difficult for the people other than the user.

When the process command inputted by the user by the speech and the pointing gesture is different from the result of processing by the system, the user may sound a negative expression ("No") at the end of a series of steps so that the speech recognition and the determination of meaning as described above are conducted. When the term negating the process is detected at the end of the step s2-1, the process is corrected. The correction is shown in a flow chart 3 of FIG. 16.

After the content of the input process command is clarified to the system, the contents are combined by the information integration program and actual process is conducted.

Figure 18:
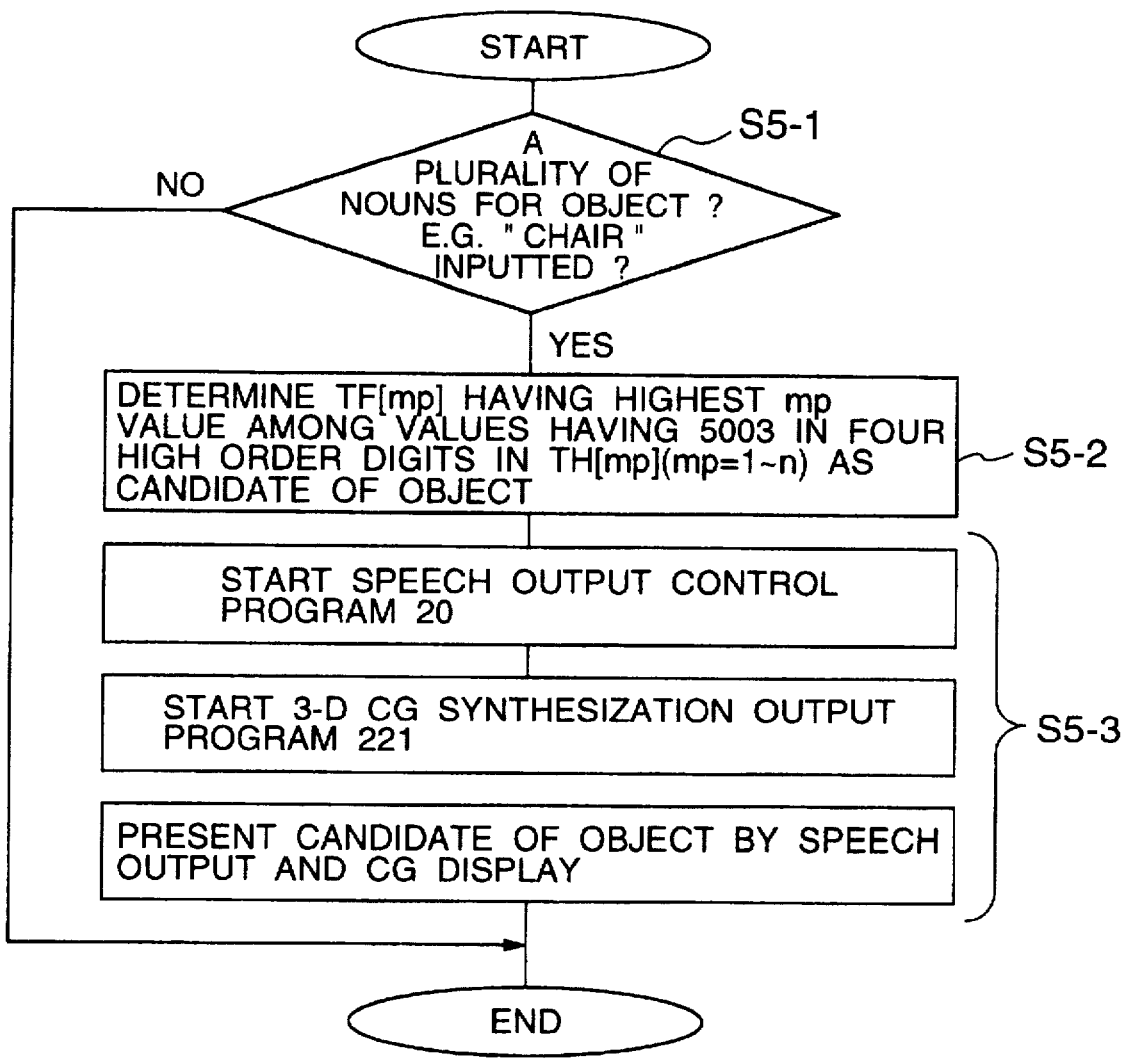
FIG. 18 shows a flow chart illustrating a process for a vague input from a user.

If the input command includes an object which the system cannot readily determine, for example, when one of a plurality of objects is to be specified but the user fails to specify it, a process shown a flow chart 5 of FIG. 18 is conducted. The presence or absence of a command object which the system cannot specify is determined (S5-1), a highest possible process object is specified based on the information which the system possesses (s5-2), and it is presented to the user by speech or a 3-D color graphics (the announcement by the human image in the window B, the identification and display of the object) (s5-3).

A graphics number corresponding to the specified object noun is acquired (s2-2), the graphics number is stored in the memory (s2-3) and the process is conducted. In the flow charts 1 and 2, since the process command is assumed to be "copy", a "copy" process is conducted (s2-4).

At the end of the series of steps, the system changes the output status of the process result depending on the skill of the user in order to provide a batter input environment to the user.

Figure 19:
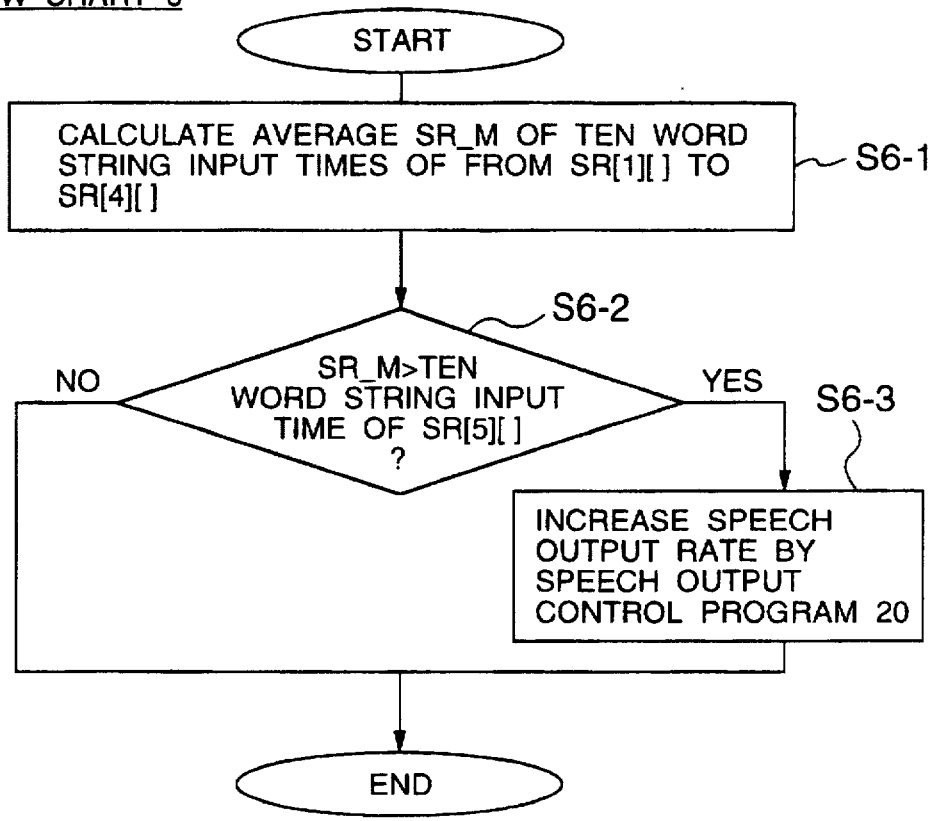
FIG. 19 shows a flow chart illustrating an output modification of the system for a user input status.
Figure 20:
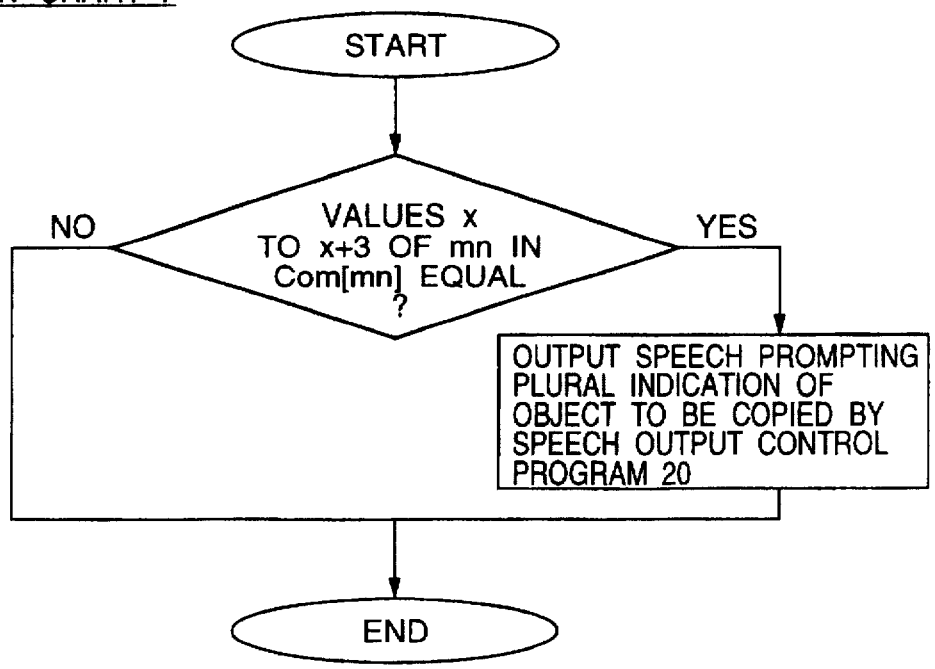
FIG. 20 shows a flow chart for proposing a simplified process to a user.
Figure 21:
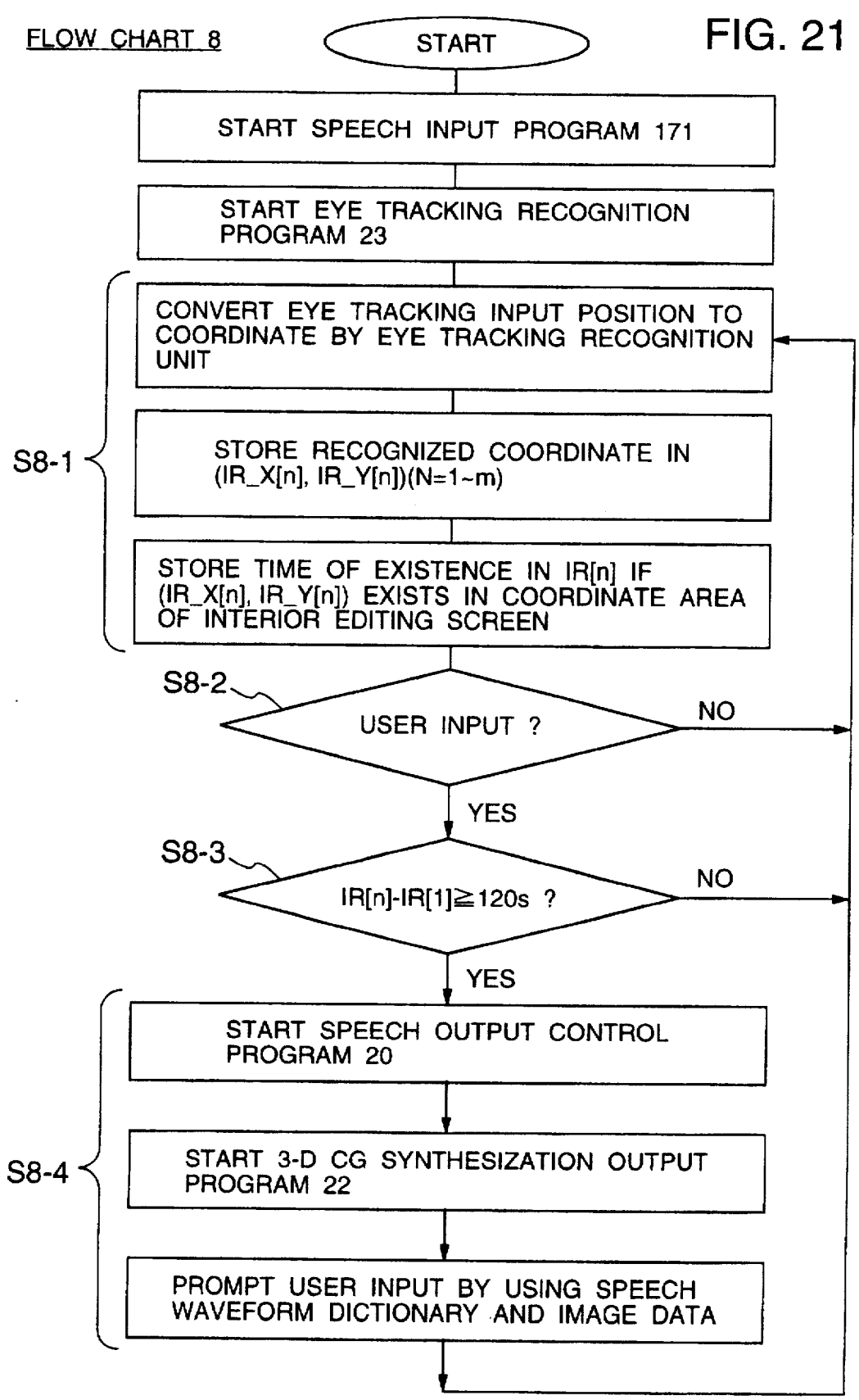
FIG. 21 shows a flow chart illustrating an operation to prompt a user input.

For example, as shown in a flow chart of FIG. 19, the user input time, for example, the input time for ten words is detected (s6-1), and if the input time is within a predetermined time (s6-2), a speech output rate of the system is increased (s6-3).

The process content by the user is monitored, and if the same step continues more than a predetermined number of times, the system announces a simple processing method such as collective destination of the object or collective processing. This process is shown in a flow chart 7 of FIG. 20.

In the present invention, the user eye tracking is continuously monitored. This is conducted in parallel with the flow charts 1 and 2. This process is shown in a flow chart 8 of FIG. 21. A position of the user eye tracking, that is, the position at which the user is looking on the display screen and the time are stored in the memory (s8-1). When the user input by speech or the pointing gesture is absent (s8-2), the time during which the user looks at the screen is checked.

When the look-at time exceeds a predetermined time (s8-3), the system prompts the input to the user by speech or image (s8-4). When the user input is present or the user look-at time does not exceed the predetermined time, the user eye tracking is continuously monitored.

An operation to move a chair on the display 3-2 is now explained.

Figure 6:
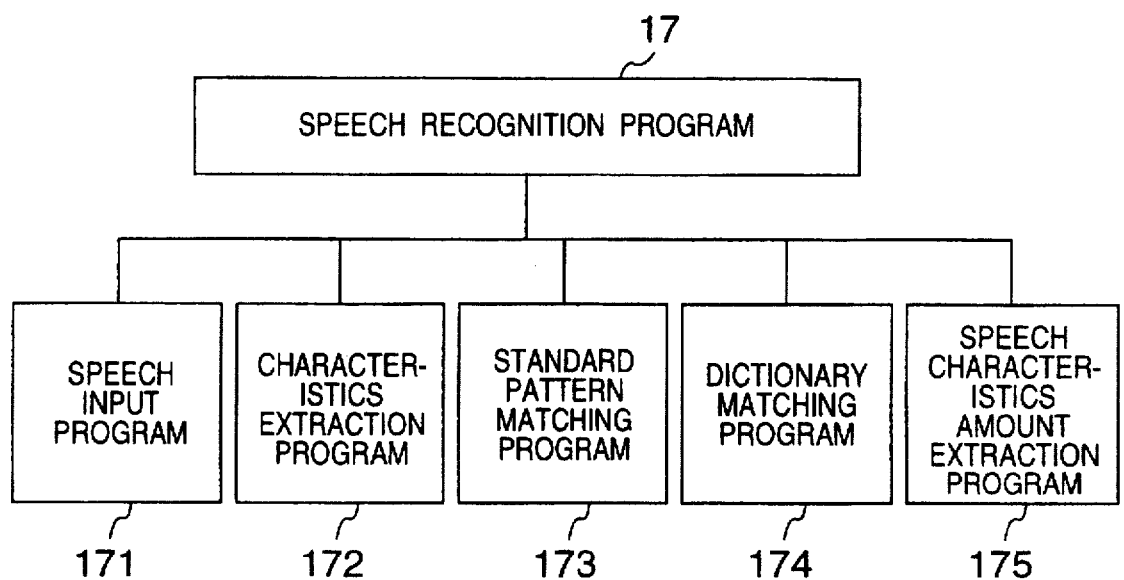
FIG. 6 shows a structure of a speech recognition program.

As shown in FIG. 6, the speech recognition program 17 comprises a speech input program 171, a characteristic extraction program 172, a standard pattern matching program 173 and a dictionary matching program 174.

Figure 7:
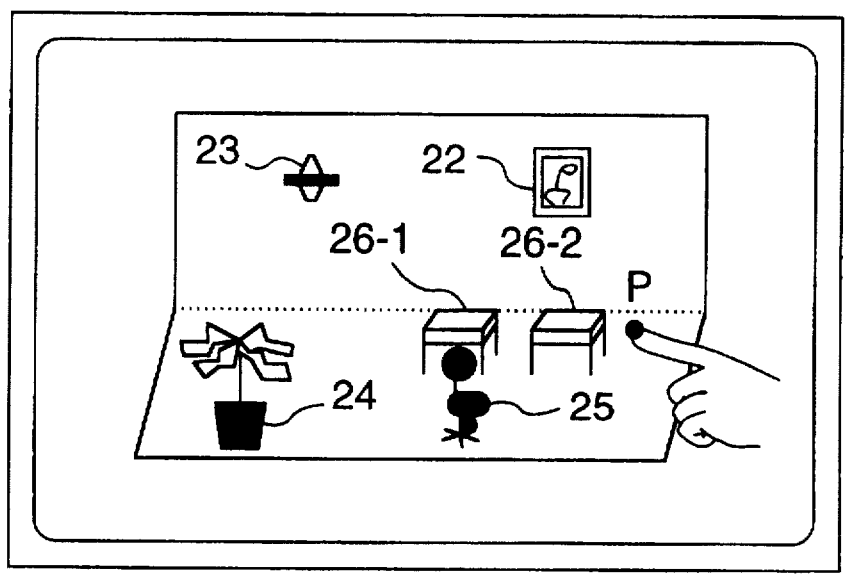
FIG. 7 shows an input screen to the system of the present invention.

When the speech recognition program 17 is started, the speech input program is first started. As shown in FIG. 7, the user directs a target position P of the movement of the chair 25 on the touch panel 5-1 while he inputs the operation (movement) through the microphone 5-2. The eye tracking recognition program 23 is started to converts the information inputted from the eye tracking input device 5-3 to coordinate values. The form of the coordinate values are such that a time at which the user eye line is directed to the display is stored in an eye tracking recognition buffer IR[n] (n=1_m) on the main memory 2 with the eye line position for the respective times of IR[n] being (IR_X[n], IR_Y[n]).

The time at which the speech is inputted is stored in a two-dimensional array of a speech recognition buffer memory SR [ ][ ] (a first dimension of the array is incremented when the system is started up) on the main memory 2. The speech recognition buffer memory is not shown.

When a speech is inputted from the microphone 5-2, the time at which the speech is inputted during the system availability time is stored in a buffer memory TG[ ] on the main memory 2 as the utilization time. The input speech itself is converted to a digital speech signal by A/D conversion in accordance with the speech input program 171. The A/D conversion process may be either a software process or a hardware process. Then, the characteristics extraction program 172 is started to convert the digital speech signal to a time sequence of LPC kepstrum coefficients as described in "Fundamental of Speech Information Processing" by Saitoh and Nakata Ohm Publishing Co., 1981, as characteristics vectors in a frame period of 10 ms. Buffer memories P and Q and a memory TF for storing task process numbers, on the main memory 1 are reset to zero at the start-up of the system. The pointing recognition program 18 reads a contact coordinate when a user finger tip or a pen is contacted to the touch panel 5 through the panel control unit 3, increments P each time it reads a coordinate, and writes a coordinate input time to the array memory T[P], the read x coordinate to the array memory X[Q][P] and the y coordinate to the array memory Y[Q][P] in the pointing area table on the main memory 2.

As shown in FIG. 8, the pointing area table comprises a coordinate number 200, a coordinate input time 201, an x coordinate 202 and a y coordinate 203, and the input time when the finger touches the panel and the x coordinate and the y coordinate are stored in the sequence of input starting from the coordinate number 1. When a predetermined time T1 elapses since the finger tip or the pen has moved off the touch panel 5, the buffer memory Q is incremented, and after a predetermined time $T_0$, the writing is terminated.

The standard pattern matching program 173 and the dictionary matching program 174 are then started. As shown in FIG. 9, the word dictionary used when the dictionary matching program 174 is started comprises a word 231, a content of word 232 and a concept number 232. The concept number is an identification number classifying words of similar meaning. First, the matching of the previously determined characteristic vector to the speech standard pattern data 22 is conducted in a manner as described in, for example, "Discussion on A method for Accepting An Colloquial Speech Text in An Information Retrial System by Speech Input" by Kitahara et al, The Institute of Acoustics of Japan, 35-7, 1991 so that the input speech is converted to a character string. For example, it is converted to "Move a chair here (a Japanese Kana-string sentence, Isu wo kochira ni idou shite)". In this case, the character string is analyzed for form element by using a conventional method, for example a longest match method as described in "Kana to Kanji Conversion by A computer" by Aizawa et al, NHK Technical Research, 25. May, 1973. The matching to the word dictionary results in the form element information such as (chair (isu), object noun, 5001), (a Japanese Kana character "wo", particle for instruction of object, 904), (here (kochira), particle for instruction of place, 601), (a Japanese Kana character "ni", particle for instruction of place, 905) and (copy (hukusha), verb for copying, 703). The number of the command representing the concept of "copy" is inputted to the command memory Con so that Com=703. Then, the information integration program 19 is started. Since there is one demonstrative pronoun (here (kochira)) in the present example, the system recognizes that the coordinates X[1][p], Y[1][p] resulting from the pointing by the user indicate the copy position. Namely, it determines the coordinates (X[1][1], Y[1][1]) as the copy position. As a result, in the present example, the graphics number 5001001 is extracted from the result of matching of the object number of (chair (isu), object noun, 5001) and the word number of the graphics draw table, and the graphics number is inputted in the object number TH[m] (m=1_n) as TH[1]=5001.

First, the "copy" operation is performed by Com[1]=703 and the isu (chair) corresponding to the selected graphics number is copied to the coordinates X[1][1], Y[1][1] on the main memory 2. When one task is completed, the graphics draw table is updated and the task process number TF is incremented. Now, the task process number TF is incremented to TF=2.

The implementation form of the movement of the interior design support system of the present invention has been described.

A user support function (hereinafter referred to as an agent function) of the interior design support system of the present invention is now explained.

The user inputs the speech "Move a chair here" and points the target position of movement. It is assumed that the speech recognition program 17 mis-recognizes "Move" as "Copy".

When the user notices the copy operation by the system and sounds "(No, move (Chigau, idoh)", the speech is recognized and (no (chigau), verb for negation, 704) and (move (idoh), verb for movement, 702) are extracted. When the verb for rejection 704 is extracted, error=+1 is set. As the verb for rejection 704 is extracted, a value of (current TF value) 1=mn is inputted to the array number s of the graphics number TH[ ] and the command number Com [ ] so that TH[mn], Com[mn].

Then, the verb "move (idoh) 702 inputted following to the negative term is substituted by Com[mn]=703 so that Com [mn]=703, and the table of (current draw table number)-1 is looked up so that it is updated by the draw table of that number. When the correction of the mis-recognition is conducted a plurality of times, that is, when the error variable is incremented twice or more without the TF value being changed, the look, action or gesture of the human image displayed on the window B is changed by using the image data 29 stored in the file form in a manner described in U.S. Ser. No. 08/114,083 filed on Aug. 31, 1993 entitled "Sign-Language Learning Apparatus". The disclosure of the U.S. application is incorporated herein by reference.

Figure 10:
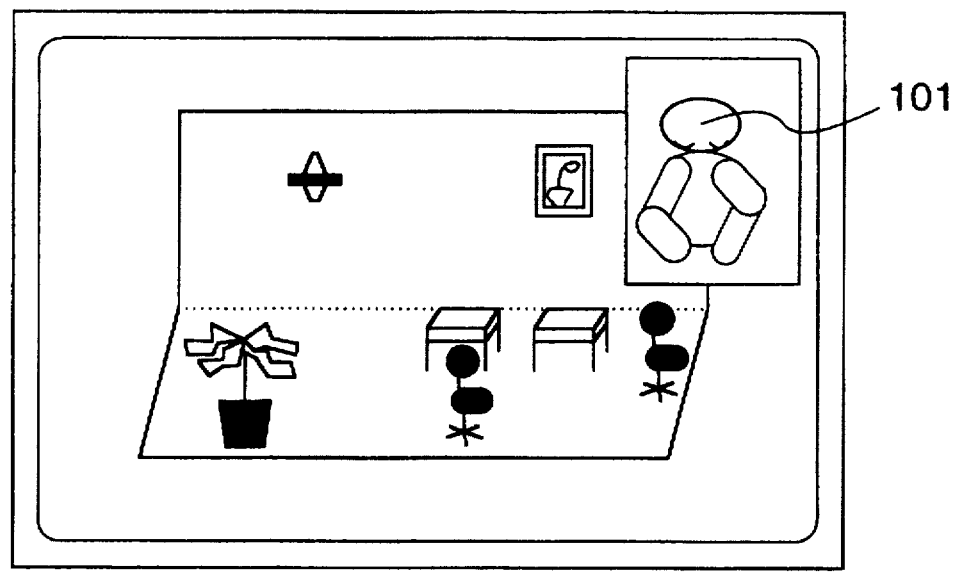
FIG. 10 shows an example of a display screen of the present invention.

FIG. 10, 101 shows the action of apology by the human image on the window B.

As another agent function, an editing support to secret information is shown.

Figure 11:
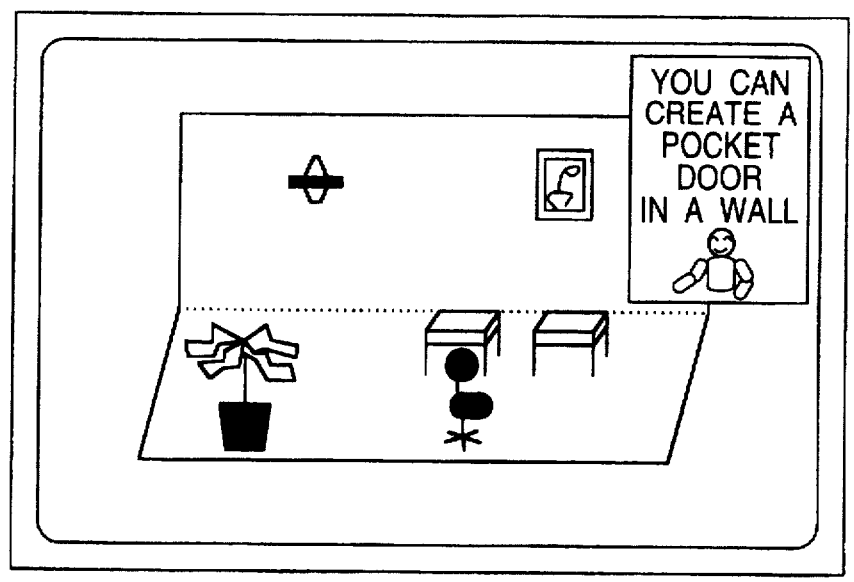
FIG. 11 shows an example of a display screen of the present invention.

For example, when the user inputs a command "Search a place to mount a safe", the speech recognition method extracts (safe, secret noun, 501), (place, noun, 502) and (search, verb for search, 311). When the inclusion of the secret noun is detected, the 3=d CG display reduces the size of the human image displayed on the window B as shown in FIG. 11, by the 3-D CG synthesizing program. When the editing operation for the secret noun is recognized, the image recognition program 24 is started and the image information read by the image recognition camera 14 is analyzed by the image recognition control unit to extract the human image in front of the display.

When only a human image other than the pre-registered user is recognized, detailed of the place is displayed by text display or the 3=D CG. As to the speech output, the content of the file storing detailed content of the speech waveform dictionary 28 is outputted at a reduced volume level by the speech output control program.

When a plurality of human images facing the display are recognized and a human image other than the pre-registered users is included therein, the speech output control program is started by the status recognition program 25 and speech is outputted on the basis of the speech waveform dictionary 28 by that program. As shown in FIG. 12, the speech waveform dictionary 28 comprises a speech waveform file and character string data. For the speech output, the speech waveform file is used, and for the text display, the character string data is used. When the eye tracking recognition program 23 detects that a time period IR during which the user eye tracking is directed to the display 4 is longer than 120 seconds, for example, and no speech input is made during that period, the dialogue control program 21 is started and the input from the agent is prompted by the speech output control program 20 and the 3-D CG synthesization program by using the speech waveform dictionary so that the system grasps the user status. When the time period during which (IR_X[n], IR_Y[n]) is out of the display coordinate area of the agent while the speech output is made from the system by the speech output control program 20 is N≧10, the image display of the agent is cancelled.

Other agent function is now explained.

Figure 13:
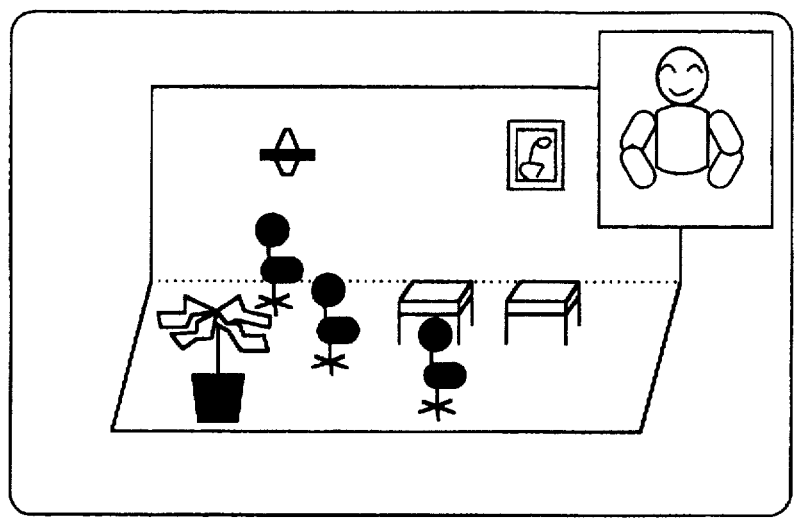
FIG. 13 shows an example of a display screen of the present invention.

It is a support function for a case where the user input is vague. For example, when the command "Move a chair here" is issued in the screen drawn by the graphics draw table shown in FIG. 13, there are a plurality of chairs and the system cannot identify one chair to be edited. Then, the operation history is referenced. Namely, the TH[mp] having the highest mp value among the values having 5003 in the four high order digits in the TH[mp] (mp=1_n) on the main memory 2 is taken as a candidate of object. This is because the most recently operated object is highly probably the current object for operation. Then, the system indicates to the user that the candidate for the object cannot be identified by the user input and the candidate for object which the user has identified, by using the speech output or the CG display, or both.

When the speech input time SR on the main memory 2 recorded during the currently utilization is SR[5][ ], if there is a significant difference in the comparison of an average time of ten character strings form SR[1][ ] to SR[4][ ] and the input time of ten character strings in SR[5][ ], the system response is conducted by only the 3-D CG or the speech output rate is increased by the speech output control program.

A still further agent function is described. In the present system, as described above, the user eye tracking is read by the eye tracking input device 5-3 to monitor the position of notice by the user on the display. If the user eye tracking is rarely directed to the window B, the support for the operation to the user is conducted by the speech output rather than the expression by the gesture. Namely, the user eye tracking position and time are monitored, and if the time period during which the eye tracking is in the window B is shorter than a predetermined time, the system determines that the window B is not necessary and deletes the window B or reduces the window B by iconizing it.

When the user wants to acquire the information from only the speech output, he input by speech "No CG display". The input speech is recognized by the speech recognition program 17 and the image display program 22 for the window B is stopped. Thus, the CG display of the window B is stopped. The address information of the image data of the information by the gesture of the human image in the window B is converted to the speech output data and it is outputted by using the speech by the speech output control program. The conversion from the image data to the speech data is conducted by referencing the speech data address recorded in the image data table. The speech data address indicates the address of the speech data in the speech output program.

A still further agent function is described.

The system holds the content of the immediately previous command operated by the user, by the status recognition program 25. If the same command as the immediately previous command is inputted serially, the system also holds the number of times.

It is assumed that the user conducts the same operation a plurality of times (for example, repeats the copy a number of times). The system checks the number of times of serial input of the same command and if it exceeds a predetermined number of times (for example, three times), the system outputs a message teaching the next operation such as (If all objects to be copied are indicated, they are copied". This message may be character display or speech message. If an affirmative reply such as "Yes" is presented from the user for the system message, the system executes the operation which it taught. If a negative reply such as "No" is presented by the user, the system suspends the output of the message for supporting the continuous user operation until the number of times of input of the command is cleared, even if the number of times of continuous input of the command exceeds the predetermined number.

When a user interruption such as "How many types of red included?" is issued while the system conducts the speech output or the operation, the current process is interrupted by the dialogue control program and the process for the input information is conducted first.

The speech waveform file number which is the interrupted speech output information or the TH[ ], Com[ ] which are the content of operation are stored in an interrupted speech output buffer IntrSR[h] and an interrupted process buffer IntrExe[h] structure (h=1_n), and after the processing of the input information, the IntrExe[h] is processed.

The dialogue agent is displayed and the response message is sounded to accommodate the help function the user vague input and the input error.

Specifically, an information processing apparatus utilizing speech comprising:

information display means for displaying information;

position information input means for user inputting continuous position information by a pointing gesture;

speech information input means for inputting speech information;

input information storing means for temporarily storing the position information and the speech information inputted by said input means;

language information storing means for storing an acoustic standard pattern representing vocal sound/syllable or word information and grammar information;

speech information storing means for storing content of speech to be used to output speech;

draw information storing means for storing draw or display information to be used for drawing;

speech information analysis means for comparing the speech inputted by said input means by using at least one of the acoustic standard pattern representing the vocal sound/syllable or the word information and the grammar information stored in said language information storing means;

speech output means for outputting speech information by speech information waveform stored in said speech information storing means;

image output means for synthesizing and outputting an image by using said draw image storing means; and operation history storing means for storing history of user operations;

the information processing apparatus utilizing speech including an agent type interface comprising:

system utilization status extraction means for extracting a user input error, an availability status for a queue and a utilization status;

agent display control means for displaying an agent on a screen by said information display means and said image output means; and speech content control means for displaying the operation of the agent in accordance with the information extracted by said system utilization status extraction means and speech content sounded by the agent by said speech output means in synchronism or asynchronism with the operation of the agent.

Thus, the manner of display of the agent is changed in accordance with the operation process and the operation step of the system to provide the output which is easy to understand for the user.

In the agent type interface, said system utilization status extraction means includes an intent expression information slot for storing the word information extracted by said speech information analyzing means and the pointing information stored in said input information storing means and means for checking the store status of said intent expression information slot for each user input to determine the system utilization status, the user input form for attribute of the information is determined until the slot is fully filled up by the necessary information, and the user is guided by using the agent so that the user inputs the necessary information by the input form, and wherein when mis-recognition occurs and an error operation is conducted, only the error portion is inputted by speech so that the user can actively accommodate for the error.

Thus, the system can understand the user input negative term and correction term, and operate to retry for the correction portion so that the user can readily conduct the error process.

In the agent type interface, said system utilization status extraction means has a function of detecting a non-input status in a series of user operations and detecting incompletion of the series of operations, and when the non-input status is detected, inquiring by the agent to the user to grasp the user status and conduct the user support in accordance with the status.

Thus, the input from the user is prompted to actively grasp the user status to enable smooth input.

In the agent type interface, said agent display control means has a function of presenting information by using one or more of a 3-D graphics, a motion picture and a still image.

Thus, the system operates to grasp the operation process of the system and the system utilization status of the user from the result of image recognition and speech recognition to enable the determination of the response form to the user.

In the agent type interface, each of said agent display control means and said agent speech content control means has a function of grasping the user status in accordance with the information extracted by said system utilization status extraction means to determine the type of the agent response to the user by the speech output and the image output, only the gesture by the image output or only the text display.

Thus, the system response form is determined by the system utilization status of the user and the output which is ready to understand for the user is provided.

In the agent type interface, each of said agent display control means and said agent speech content control means has a function of adjusting a volume level of the speech output in accordance with the content to be spoken and enlarging or reducing the agent display area and the gesture action range.

Thus, the volume level of the speech output is changed in accordance with the system utilization status of the user and the gesture action range of the agent is changed to provide the output which meets the user requirement.

In the agent type interface, said display and speech agent function has a help function for enabling explanation of an operation procedure of said information processing apparatus, a possible input and an operation content as required by a user request.

Thus, the necessary information is actively presented to the use and the appropriate support to the suer is provided.

In the agent type interface, said display and speech agent function includes an agent type interface having a guide function to enable guidance by the agent and necessary guidance for the process for the mis-recognition.

Thus, the guidance is given in accordance with the user operation process and the appropriate support is provided to the user.

In the agent type interface, said display and speech agent function has a guide function of enabling guidance to the user for any more efficient operation method than an operation method taken by the user for a task by using the user operation history stored in said operation history storing means.

Thus, when the user inputs the information a plurality of times in the same manner, the agent directs a shortcut method to the user to improve the user job efficiency.

In the agent type interface, said display and speech agent function includes means for detecting vague expression of the user input information and has a function of determining, when the vague expression is detected, a candidate of the user intent by utilizing the user operation history stored in said operation history storing means and presenting it to the user to confirm the intent of the user.

Thus, for the vague expression by the user, a plurality of user intent candidates are extracted to confirm the user intent so that ready error process for the user is provided.

In the agent type interface, said display and speech agent function has a confirmation function of accessing to a database storing the information required by the user based on the result of the extraction of the user intent and searching the information, and when a plurality of solutions are included in each search step, inquiring to the user to extract a valid solution.

Thus, a plurality of solutions in each operation step are presented to the user to understand the user intent so that the simple input/output process for the user is provided.

In the agent type interface, said agent function includes input rate storing means for storing a user input rate and a function to determine the response content to the user based on the input rate stored in said input rate storing means and a learning function to conduct the agent display and speech output to the user in accordance with sid determination.

Thus, when the user inputs the information slowly, the output information amount is increased or the output rate is decreased, and when the user inputs the information early, the output information amount is decreased or the output rate is increased so that the output is provided to conform to the system utilization state of the user.

In the agent type interface, said agent function includes eye tracking recognition means and has a learning function of determining whether the user eye line watches the agent or not, and when the user does not need the agent function, deleting the display by the agent and the sound by the speech.

Thus, when the user utilizes the system, if the user does not frequently direct the eye line to the agent display, the agent output to the user is cancelled to prevent the impedance to the user operation.

In the agent type interface, said agent function has a function of interrupting the response output when the user conducts other job request while the system sends a response, conducting the response to said job request first, and temporarily storing the content of the interrupted response output by said speech output content storing means.

Thus, when the user interruption is issued, the system first conduct the operation of the interruption and stores the content of the interrupted operation to enable the user oriented operation.

In the agent type interface, said agent function has a function of changing, when the mis-recognition by the system continuously occurs, the speech output manner and content of the agent and the look of the agent in accordance with the number of times of mis-recognition and the user status extracted by said system utilization status extraction means.

Thus, the tone of the speech and the look of the agent are changed in accordance with the frequency of mis-recognition to control the attitude of the system so that the user can comfortably utilize the system.

In the agent type interface, each of said agent display control means and said agent speech content control means has a function of selecting the response means of the system in accordance with the user request.

Thus, when the user directs the manner to output the information, the system operates to output the information in the directed manner so that the information of the form of the user desire is outputted.

The invention has been described with reference to the preferred and alternate embodiments. Obviously, modifications and alterations will occur to those of ordinary skill in the art upon reading and understanding the present invention. It is intended that the invention be construed as including all such modifications and alterations in so far they come with the scope of the appended claims or the equivalents thereof.

What is claimed is:

1. In an information processing apparatus utilizing speech comprising:

information display means for displaying information;

position information input means for user inputting continuous position information by a pointing gesture;

speech information input means for inputting speech information;

input information storing means for temporarily storing the position information and the speech information inputted by said input means;

language information storing means for storing an acoustic standard pattern representing vocal sound/syllable or word information and grammar information;

speech information storing means for storing content of speech to be used to output speech;

draw information storing means for storing draw or display information to be used for drawing;

speech information analysis means for comparing the speech inputted by said input means by using at least one of the acoustic standard pattern representing the vocal sound/syllable or the word information and the grammar information stored in said language information storing means;

speech output means for outputting speech information by speech information waveform stored in said speech information storing means;

image output means for synthesizing and outputting an image by using said draw image storing means; and operation history storing means for storing history of user operations;

said information processing apparatus utilizing speech including an agent type interface comprising:

system utilization status extraction means for extracting a user input error, an availability status for a queue and a utilization status;

agent display control means for displaying an agent on a screen by said information display means and said image output means; and speech content control means for displaying the operation of the agent in accordance with the information extracted by said system utilization status extraction means and speech content sounded by the agent by said speech output means in synchronism or asynchronism with the operation of the agent.

2. An information processing apparatus utilizing speech including an agent type interface according to claim 1 wherein said system utilization status extraction means includes an intent expression information slot for storing the word information extracted by said speech information analyzing means and the pointing information stored in said input information storing means and means for checking the store status of said intent expression information slot for each user input to determine the system utilization status, the user input form for attribute of the information is determined until the slot is fully filled up by the necessary information, and the user is guided by using the agent so that the user inputs the necessary information by the input form, and wherein when mis-recognition occurs and an error operation is conducted, only the error portion is inputted by speech so that the user can actively accommodate for the error.

3. An information processing apparatus using speech including an agent type interface according to claim 1 wherein said system utilization status extraction means has a function of detecting a non-input status in a series of user operations and detecting incompletion of the series of operations, and when the non-input status is detected, inquiring by the agent to the user to grasp the user status and conduct the user support in accordance with the status.

4. An information processing apparatus using speech including an agent type interface according to claim 1 wherein said agent display control means has a function of presenting information by using one or more of a 3-D graphics, a motion picture and a still image.

5. An information processing apparatus utilizing speech including an agent type interface according to claim 1 wherein each of said agent display control means and said agent speech content control means has a function of grasping the user status in accordance with the information extracted by said system utilization status extraction means to determine the type of the agent response to the user by the speech output and the image output, only the gesture by the image output or only the text display.

6. An information processing apparatus utilizing speech including an agent type interface according to claim 1 wherein each of said agent display control means and said agent speech content control means has a function of adjusting a volume level of the speech output in accordance with the content to be spoken and enlarging or reducing the agent display area and the gesture action range.

7. An information processing apparatus utilizing speech including an agent type interface according to claim 1 wherein said display and speech agent function has a help function for enabling explanation of an operation procedure of said information processing apparatus, a possible input and an operation content as required by a user request.

8. An information processing apparatus utilizing speech including an agent type interface according to claim 2 wherein said display and speech agent function includes an agent type interface having a guide function to enable guidance by the agent and necessary guidance for the process for the mis-recognition.

9. An information processing apparatus utilizing speech including an agent type interface according to claim 1 wherein said display and speech agent function has a guide function of enabling guidance to the user for any more efficient operation method than an operation method taken by the user for a task by using the user operation history stored in said operation history storing means.

10. An information processing apparatus utilizing speech including an agent type interface according to claim 1 wherein said display and speech agent function includes means for detecting vague expression of the user input information and has a function of determining, when the vague expression is detected, a candidate of the user intent by utilizing the user operation history stored in said operation history storing means and presenting it to the user to confirm the intent of the user.

11. An information processing apparatus utilizing speech including an agent type interface according to claim 1 wherein said display and speech agent function has a confirmation function of accessing to a database storing the information required by the user based on the result of the extraction of the user intent and searching the information, and when a plurality of solutions are included in each search step, inquiring to the user to extract a valid solution.

12. An information processing apparatus utilizing speech including an agent type interface according to claim 1 wherein said agent function includes input rate storing means for storing a user input rate and a function to determine the response content to the user based on the input rate stored in said input rate storing means and a learning function to conduct the agent display and speech output to the user in accordance with sid determination.

13. An information processing apparatus utilizing speech including an agent type interface according to claim 1 wherein said agent function includes eye tracking recognition means and has a learning function of determining whether the user eye line watches the agent or not, and when the user does not need the agent function, deleting the display by the agent and the sound by the speech.

14. An information processing apparatus utilizing speech including an agent type interface according to claim 1 wherein said agent function has a function of interrupting the response output when the user conducts other job request while the system sends a response, conducting the response to said job request first, and temporarily storing the content of the interrupted response output by said speech output content storing means.

15. An information processing apparatus utilizing speech including an agent type interface according to claim 1 wherein said agent function has a function of changing, when the mis-recognition by the system continuously occurs, the speech output manner and content of the agent and the look of the agent in accordance with the number of times of mis-recognition and the user status extracted by said system utilization status extraction means.

16. An information processing apparatus utilizing speech including an agent type interface according to claim 1 wherein each of said agent display control means and said agent speech content control means has a function of selecting the response means of the system in accordance with the user request.

17. An editing support system comprising:

display means for displaying an object to be edited and an edition result;

a plurality of types of input means for inputting edit commands for the object to be edited;

output means for outputting an edit status for the object to be edited:

control means for specifying an operation for the edit command and controlling to execute the operation;

storing means for storing operation history;

means for specifying a candidate of operation to be executed next by referring the operation history; and means for presenting the content of the candidate by speech or an image, wherein said operation history stores the content of past edit commands and input times of the edit commands, and when the same edit command continues over a predetermined number of times, said system stands by to repeat the same edit command without waiting for an external edit command, and outputs the stand-by state as the editing status.

18. An editing support system comprising:

display means for displaying an object to be edited and an edition result;

a plurality of types of input means for inputting edit commands for the object to be edited;

output means for outputting an edit status for the object to be edited;

control means for specifying an operation for the edit command and controlling to execute the operation;

storing means for storing operation history;

means for specifying a candidate of operation to be executed next by referring the operation history; and means for presenting the content of the candidate by speech or an image, wherein said operation history stores the content of past edit commands and the input times of the edit commands, and when a predetermined time elapses from the input time of the immediately previous edit command, a message is outputted to prompt the input of an edit command in accordance with the elapsed time.

19. An editing support system according to claim 18 wherein when a content to negate and correct the immediately previous edit command is inputted by said input means, a result of the execution of the content corrected for the object to be edited by the immediately previous edit command is outputted.

20. An editing support system according to claim 18 wherein said output means for outputting the editing status is a partial area displayed on said display means, and the image displayed in the partial area is changed in accordance with the editing status.

* * * * *